(12) United States Patent
Oshio et al.

(10) Patent No.: US 12,032,570 B2
(45) Date of Patent: Jul. 9, 2024

(54) COMPUTER-READABLE RECORDING MEDIUM STORING INFORMATION GENERATING PROGRAM, INFORMATION GENERATING METHOD, AND INFORMATION GENERATING APPARATUS

(71) Applicant: FUJITSU LIMITED, Kawasaki (JP)

(72) Inventors: Syohei Oshio, Ota (JP); Naohiro Kishishita, Akashi (JP); Shigenori Inoue, Nagoya (JP); Masahiro Nakajima, Tsukuba (JP); Daiki Hanawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 17/722,493

(22) Filed: Apr. 18, 2022

(65) Prior Publication Data
US 2022/0335046 A1 Oct. 20, 2022

(30) Foreign Application Priority Data
Apr. 20, 2021 (JP) ................. 2021-071474

(51) Int. Cl.
*G06F 16/2452* (2019.01)
(52) U.S. Cl.
CPC .............. *G06F 16/24522* (2019.01)
(58) Field of Classification Search
CPC . G06F 16/24522; G06F 16/93; G06F 16/3337
See application file for complete search history.

(56) References Cited

U.S. PATENT DOCUMENTS

| | | | |
|---|---|---|---|
| 2018/0203924 A1* | 7/2018 | Agrawal | G06F 40/18 |
| 2020/0142890 A1 | 5/2020 | Zhang et al. | |
| 2020/0293717 A1* | 9/2020 | Kobayashi | G06F 40/284 |
| 2020/0341976 A1* | 10/2020 | Aggarwal | G06Q 10/10 |
| 2022/0197905 A1* | 6/2022 | Liu | G06F 16/248 |

FOREIGN PATENT DOCUMENTS

| | | |
|---|---|---|
| JP | 2020-71865 A | 5/2020 |
| WO | WO-2021053391 A1 * | 3/2021 |

OTHER PUBLICATIONS

Ture, Learning to Translate for Multilingual Question Answering, pp. 574-584. (Year: 2016).*

* cited by examiner

*Primary Examiner* — Albert M Phillips, III
(74) *Attorney, Agent, or Firm* — Fujitsu Intellectual Property Center

(57) ABSTRACT

A non-transitory computer-readable recording medium stores an information generating program causing a computer to execute processing of: in an information search using a trained machine learning model generated by machine learning using training data in a first language, converting a search condition in a second language different from the first language to the search condition in the first language; searching information in the first language by inputting the search condition converted to the first language to the machine learning model; and generating training data with the search condition converted to the first language as a feature value and the searched information in the first language as a correct answer label.

9 Claims, 8 Drawing Sheets

FIG. 3

| ID | TITLE | BODY | LANGUAGE |
|---|---|---|---|
| Doc_001 | "Manyuaru A"(Japanese) corresponding to "Manual A"(English) | "aiu..."(Japanese) corresponding to "abc..."(English) | Ja |
| Doc_002 | "Manyuaru B"(Japanese) corresponding to "Manual B"(English) | "kakiku..."(Japanese) corresponding to "def..."(English) | Ja |
| Doc_003 | "Manyuaru C"(Japanese) corresponding to "Manual C"(English) | "sasisu..."(Japanese) corresponding to "ghi..."(English) | Ja |
| ... | ... | ... | ... |

| ID | TITLE | BODY | LANGUAGE | CORRESPONDING ID | ... |
|---|---|---|---|---|---|
| Doc_001_EN | Manual A | abc... | En | Doc_001 | ... |
| Doc_002_EN | Manual B | def... | En | Doc_002 | ... |
| Doc_003_EN | Manual C | ghi... | En | Doc_003 | ... |
| ... | ... | ... | ... | ... | ... |

COMPUTER-READABLE RECORDING MEDIUM STORING INFORMATION GENERATING PROGRAM, INFORMATION GENERATING METHOD, AND INFORMATION GENERATING APPARATUS

CROSS-REFERENCE TO RELATED APPLICATION

This application is based upon and claims the benefit of priority of the prior Japanese Patent Application No. 2021-71474, filed on Apr. 20, 2021, the entire contents of which are incorporated herein by reference.

FIELD

The embodiment discussed herein is related to a computer-readable recording medium storing an information generating program, an information generating method, and an information generating apparatus.

BACKGROUND

For assisting with inquiry-related tasks, there is a product which has functionality for making use of knowledges including documents, frequently asked questions (FAQs) and the like existing within a company, for example, by searching through the knowledges. The product centrally manages, as inquiry information, histories of all of daily occurring incidents and exchanges with users, such as inquiries from users, for example. In order to achieve highly precise knowledge search, the product uses a model generated by machine learning with, for example, a search statement as a feature value and a knowledge to be displayed for the search statement as a correct answer label.

Japanese Laid-open Patent Publication No. 2020-71865 is disclosed as related art.

SUMMARY

According to an aspect of the embodiments, a non-transitory computer-readable recording medium stores an information generating program causing a computer to execute processing of: in an information search using a trained machine learning model generated by machine learning using training data in a first language, converting a search condition in a second language different from the first language to the search condition in the first language; searching information in the first language by inputting the search condition converted to the first language to the machine learning model; and generating training data with the search condition converted to the first language as a feature value and the searched information in the first language as a correct answer label.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a search target document according to Embodiment 1;

FIG. 4 is a diagram illustrating an example of a replacement document according to Embodiment 1;

DESCRIPTION OF EMBODIMENTS

With respect to such a product, there is a demand for enabling knowledges accumulated in a specific language to be searched and utilized in a language other than the specific language. As a method for satisfying the demand, there is a method which, in a case where, for example, a search target in a specific language is searched by using another language, translates the search query to the specific language with a translation engine, performs the search, translates the search result to the other language and presents the translated search result to the user.

However, in the method in the past, how training data for a machine learning model for information search is generated is not considered. For example, when training data is generated with a search query as a feature value and information to be presented for the search query as a correct answer label, machine learning is performed by using mixed training data of search queries in various languages. Since machine learning is learning for total optimization over a training data group, there is a possibility that search precision of searches in a specific language is reduced due to effects of training data in other languages when machine learning is performed by using mixed training data of search queries in various languages.

According to one aspect, it is an object of an embodiment to improve precision of information searches using a machine learning model.

Hereinafter, embodiments of an information generating program, an information generating method, and an information generating apparatus disclosed herein will be described in detail based on drawings. This disclosure is not limited by the embodiments. The embodiments may be combined with each other as appropriate as long as they do not contradict each other.

Overall Configuration Example

Figure 1:
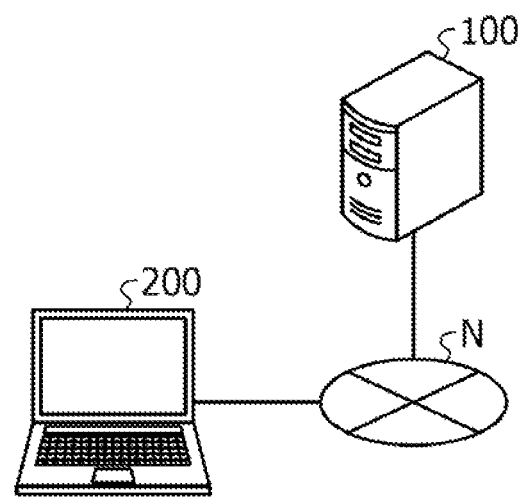
FIG. 1 is a diagram illustrating an overall configuration example of an information processing system according to Embodiment 1.

FIG. 1 illustrates an overall configuration example of an information processing system according to Embodiment 1. As illustrated in FIG. 1, the information processing system according to Embodiment 1 is a system in which an information generating apparatus 100 and a user terminal 200 are coupled communicably with each other over a network N. As the network N, various kinds of communication network may be adopted such as the Internet and an intranet whether it is wired or wireless. The network N may be configured by, for example, an intranet and the Internet via a network device such as a gateway or another device (not illustrated) instead of a single network.

The information generating apparatus 100 is a subject of execution of embodiments including Embodiment 1 and searches information described in a first language based on a search query, which is a search condition, entered via the user terminal 200 and transmits a search result to the user terminal 200. In order to search information described in the first language, the information generating apparatus 100 inputs a search query in the first language to a trained machine learning model generated through machine learning using training data in the first language to acquire a search result. For that, the information generating apparatus 100 converts a search query in a second language different from the first language to a search query in the first language. The information generating apparatus 100 generates training data with the search condition converted to the first language as a feature value and the searched information in the first language as a correct answer label.

Although, for example, the first language may be Japanese, and the second language may be English, each of them may be a language other than Japanese and English. However, as described above, when a search query is in the second language different from the first language, the information generating apparatus 100 converts the search query to the first language and generates training data by using the search query in the first language.

In this manner, even when a search query for searching information in the first language is in another language, the information generating apparatus 100 converts the search query to the search query in the first language and may thus suppress reduction of precision of searches in the first language due to training data in another language. The information generating apparatus 100 may be a distributed computing system including a plurality of computers although the information generating apparatus 100 is illustrated as one computer in FIG. 1. The information generating apparatus 100 may be a cloud server apparatus managed by a cloud service provider that provides cloud computing services.

The user terminal 200 is an information processing terminal used by a user who searches information such as a document or an FAQ. The user terminal 200 may be a desktop personal computer (PC) or a laptop PC installed in user's office, home or the like or a mobile terminal such as a smartphone or a tablet PC.

A user accesses, for example, a website or an application provided by the information generating apparatus 100 via the user terminal 200, enters a search query that is a search condition for an information search and acquires a search result. The user may be not only a Japanese speaking user but also a user from any of various linguistic areas, and the search query to be entered may be entered in any of various languages. In a case where an information search is to be performed by an application, the application may be downloaded in advance from the information generating apparatus 100 or the like and be installed in the user terminal 200.

[Functional Configuration of Information Generating Apparatus 100]

Figure 2:
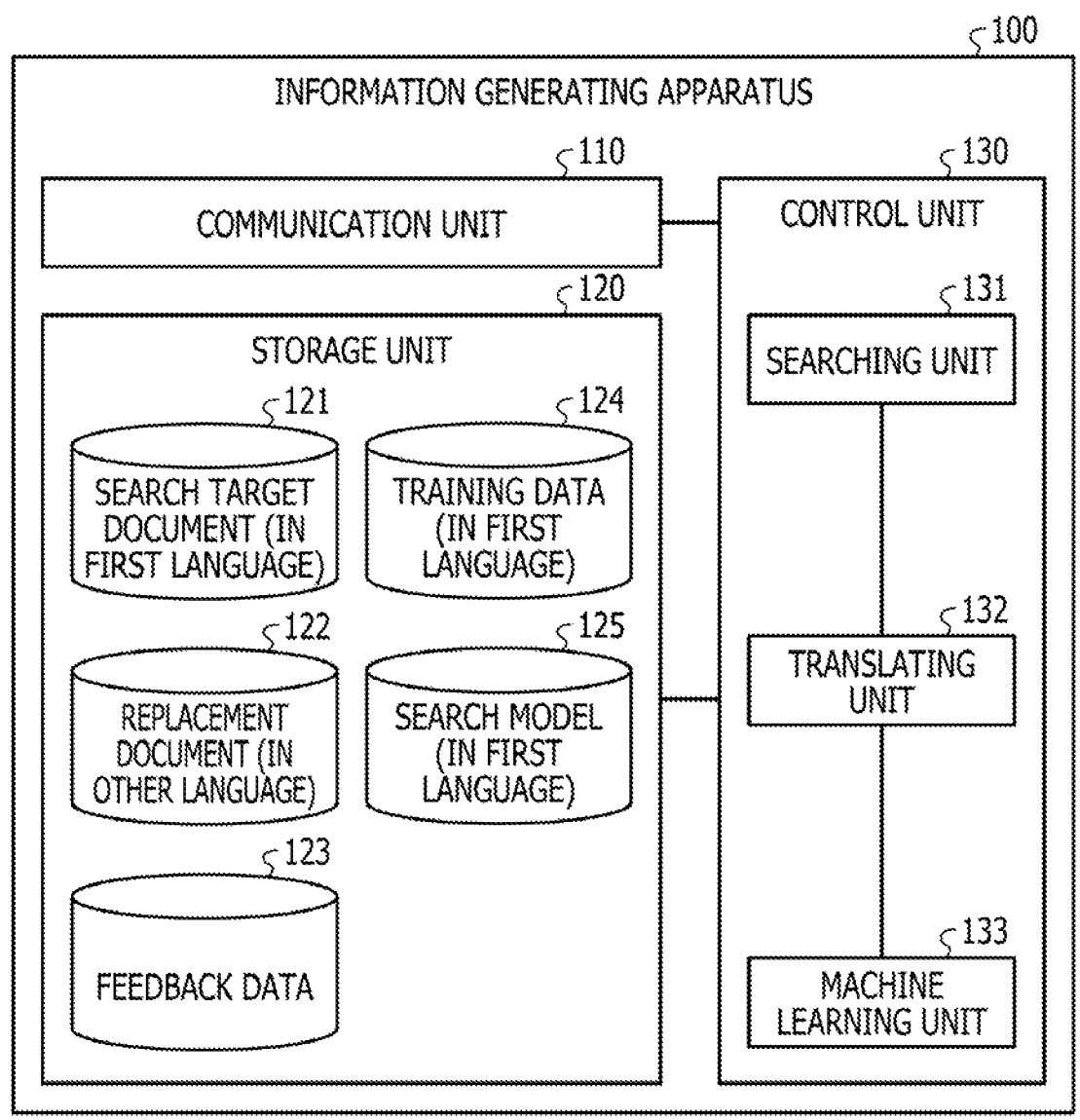
FIG. 2 is a block diagram illustrating a functional configuration of an information generating apparatus according to Embodiment 1.

Next, a functional configuration of the information generating apparatus 100 illustrated in FIG. 1 will be described. FIG. 2 is a block diagram illustrating a functional configuration of the information generating apparatus 100 according to Embodiment 1. As illustrated in FIG. 2, the information generating apparatus 100 includes a communication unit 110, a storage unit 120, and a control unit 130.

The communication unit 110 is a processing unit that controls communications with another apparatus such as the user terminal 200 and is, for example, a communication interface such as a network interface card.

The storage unit 120 is an example of a storage device that stores various kinds of data and programs to be executed by the control unit 130, and is, for example, a memory, a hard disk, or the like. The storage unit 120 stores a search target document 121, a replacement document 122, feedback data 123, training data 124, and a search model 125.

The search target document 121 stores, for example, information regarding documents, FAQs, and the like that is a target of an information search. The documents or the like to be searched are described in a first language that is Japanese, for example.

FIG. 3 illustrates an example of the search target document 121 according to Embodiment 1. As illustrated in FIG. 3, the search target document 121 stores "ID", "title", "body", "language" and the like in association.

The "ID" stored in the search target document 121 is, for example, an identifier that uniquely indicates a document to be searched. The "title" and "body" are the title and the body, respectively, of the document to be searched. The "language" is, for example, an abbreviation indicating the first language in which the document to be searched is described, such as "Ja" for Japanese or "En" for English, for example.

The replacement document 122 stores information regarding, for example, a replacement document to replace the searched document stored in the search target document 121 and to be output to the user terminal 200, and the like. The replacement document is described in a second language that is English, for example. The replacement document is a document to be presented, instead of or in addition to the searched document, to a user who requests to acquire, for example, the document in the second language rather than the first language.

FIG. 4 illustrates an example of the replacement document 122 according to Embodiment 1. As illustrated in FIG. 4, the replacement document 122 stores "ID", "title", "body", "language", "corresponding ID" and the like in association.

The "ID" stored in the replacement document 122 is, for example, an identifier that uniquely indicates a replacement document. The "title" and "body" are the title and the body, respectively, of the replacement document. The "language" is an abbreviation or the like that indicates the second language in which the replacement document is described. The "corresponding ID" is an identifier of the corresponding document to be searched, such as the "ID" of the search target document 121, for example, and, by using this, the search target document 121 and the replacement document 122 may be associated.

The feedback data 123 stores information regarding a feedback from a user with respect to, for example, the searched document or the replaced document presented to the user. The feedback data 123 is data which is generated by, for example, the information generating apparatus 100 by asking a user whether the presented document was correct or helpful, for example, via the user terminal 200.

Figure 5:
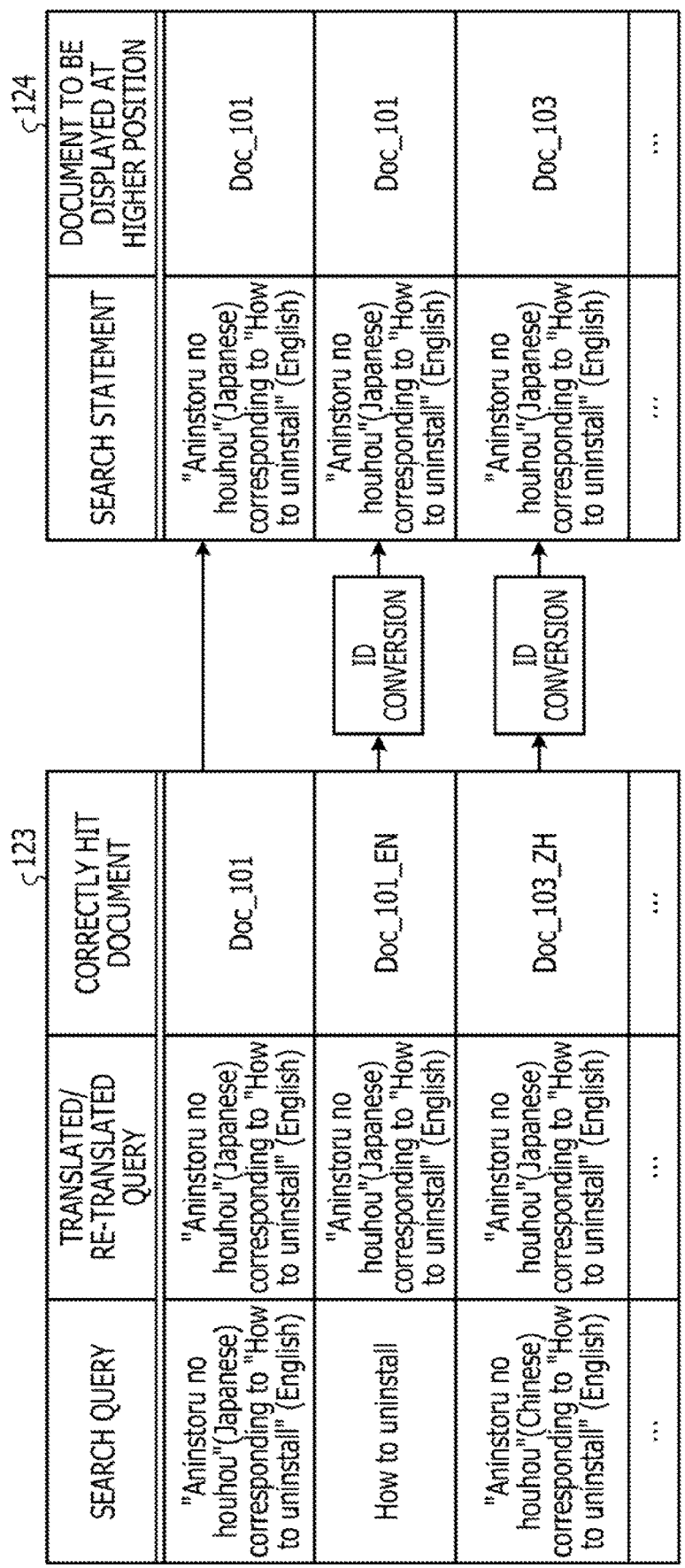
FIG. 5 is a diagram illustrating an example of feedback data and training data according to Embodiment 1.

FIG. 5 illustrates an example of the feedback data 123 and training data 124 according to Embodiment 1. As illustrated in FIG. 5, the feedback data 123 stores "search query", "translated/re-translated query", "correctly hit document" and the like in association.

The "search query" stored in the feedback data 123 is a search condition entered by a user and may be, for example, a search query or a search word. The "search query" may be entered in any of various languages rather than the first language only. The "translated/re-translated query" is a search query or a search word acquired by translating or re-translating the "search query" to the first language. If the "search query" is in a language other than the first language, the "search query" is translated to the first language while, if the "search query" is in the first language, the "search query" is translated to a language other than the first language and is then re-translated to the first language, to generate the "translated/re-translated query". The "correctly hit document" is an identifier of a document which is marked by a user as correct, helpful or the like, for example, for the search query. Since the "correctly hit document" is an identifier of the document presented to the user, it may be an identifier of the searched document or the replaced document output to the user terminal 200. The "correctly hit document" may be an answer regarding right or wrong for the presented document.

The training data 124 is training data for a machine learning model to be trained with, for example, the translated or re-translated search query in the first language as a feature value and the document in the first language output as a result of the information search for the search query as a correct answer label. The training data 124 is training data described in the first language.

As illustrated in FIG. 5, the training data 124 stores "search statement", "document to be displayed at higher position" and the like in association. The "search statement" stored in the training data 124 is a translated or re-translated search query in the first language. The "document to be displayed at higher position" is an identifier of a document which is marked by a user as correct, helpful or the like, for example, for the search query. The "document to be displayed at higher position" is an identifier of a document to be searched, which is described in the first language. Accordingly, as illustrated in FIG. 5, if the "correctly hit document" in the feedback data 123 is described in a language other than the first language, it is converted to the identifier of the corresponding document in the first language, which is then stored in the "document to be displayed at higher position".

The search model 125 is a machine learning model generated by being trained by machine learning using the training data 124 described in the first language. The search model 125 may store a model parameter for constructing the machine learning model.

Various kinds of information in addition to the information described above may be stored in the storage unit 120. The data configuration of each information is not limited to the details described above.

The control unit 130 is a processing unit that generally manages the information generating apparatus 100 and is, for example, a processor or the like. The control unit 130 includes a searching unit 131, a translating unit 132, and a machine learning unit 133. Each of the processing units is an example of electronic circuits included in the processor or an example of processes to be executed by the processor.

For an information search using the trained machine learning model generated by the machine learning using training data in the first language, the searching unit 131 performs the information search by inputting a search condition that is a search query entered by the user to the machine learning model. If the search condition is in the first language, the searching unit 131 performs the information search by inputting, to the machine learning model, the search condition translated to a language other than the first language and then re-translated to the first language by the translating unit 132. On the other hand, if the search condition is in a language different from the first language, the searching unit 131 performs the information search by inputting, to the machine learning model, the search condition translated to the first language by the translating unit 132.

If the search condition is in the first language, the translating unit 132 translates the search condition to a second language different from the first language and re-translates the search condition translated to the second language to the first language. On the other hand, if the search condition is in a language different from the first language, the translating unit 132 translates the search condition to the first language.

For a user who requests to acquire a document in a second language different from the first language as a result of an information search, the translating unit 132 translates the document to the second language and transmits the translated document to the information processing terminal, such as the user terminal 200, for example, having requested the information search. The translation of a document to the second language may be performed in advance instead of upon request for an information search. This may improve the search response more than that involving translation for each information search.

The machine learning unit 133 generates training data in the first language by using the search condition translated or re-translated to the first language by the translating unit 132. For example, the machine learning unit 133 generates training data with a search condition in the first language as a feature value and data in the first language output as a result of an information search for the search condition as a correct answer label. By using the generated training data, the machine learning unit 133 trains or re-trains the machine learning model. The machine learning unit 133 receives a feedback for a result of an information search from the user terminal 200 and, when the feedback indicates that the result of the information search was correct or the like, may generate the training data and re-train the machine learning model.

[Functional Description]

Figure 6:
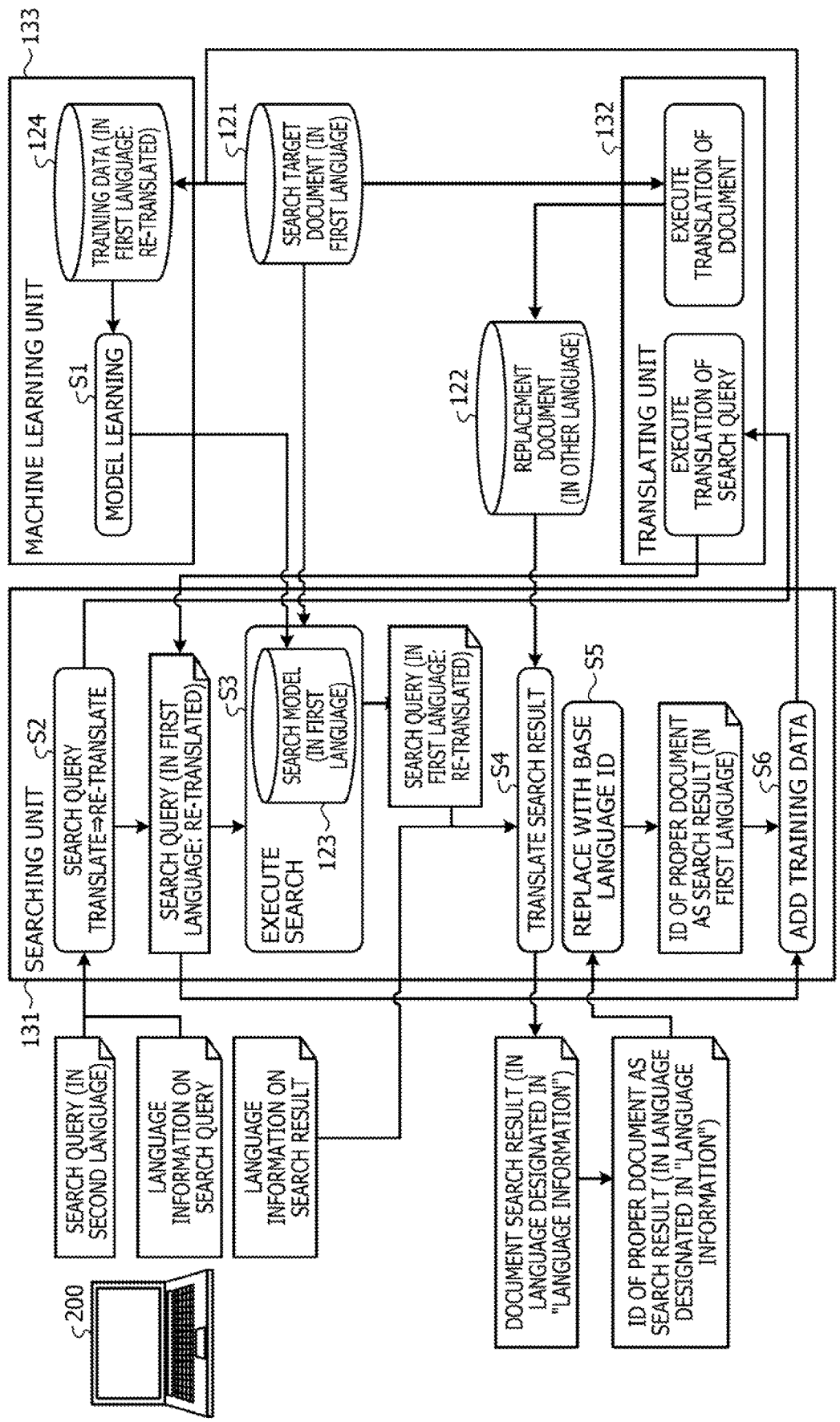
FIG. 6 is a diagram illustrating an example of an overall processing configuration according to Embodiment 1.

Next, overall information generation processing according to Embodiment 1 for reducing the difference in search result between languages of a search condition and improving precision of information searches will be described. FIG. 6 illustrates an example of an overall processing configuration according to Embodiment 1. In the example in FIG. 6, in order to search a document in a first language, a search query is entered in a second language.

First of all, as illustrated in FIG. 6, the machine learning unit 133 performs model learning with a search query translated to the first language as a feature value and a document in the first language to be output as a result of an information search for the search query as a correct answer label (step S1). Thus, the search model 125 is generated. The translation of the search query is performed by the translating unit 132.

The search query translated to the first language may be a search query in the feedback data or one acquired by translating a manually entered and generated search query in another language different from the first language to the first language. The translated search query is stored in the training data 124. The document in the first language that is a correct answer label may be an identifier that uniquely indicates the document.

Next, when receiving the search query in the second language input by the user terminal 200, the searching unit 131 transmits the search query to the translating unit 132.

Thus, the search query in the second language is translated to the first language by the translating unit 132 (step S2). In addition to or separately from the search query in the first language, the searching unit 131 may receive language information on the search query from the user terminal 200. The language information on a search query is data indicating in which language the search query is described and is designated by a user via, for example, the user terminal 200. Although the information generating apparatus 100 may thus recognize in which language the search query is described, the information generating apparatus 100 may identify the language describing the search query according to an existing technique such as language analysis, for example.

Next, the searching unit 131 inputs the search query translated to the first language to the search model 125 and, by using the document identifier output in response thereto, acquires the document in the first language as a result of the search from the search target document 121 (step S3).

Next, if the language information on the search result, which is designated by the user by using the user terminal 200, indicates a language other than the first language, the searching unit 131 acquires the document translated to the designated language, which corresponds to the document being a search result (step S4). The translated document acquired here is a document acquired by translating in advance each document in the first language stored in the search target document 121 to various languages by the translating unit 132 and storing the results in the replacement document 122. If the language information on the search result, which is designated by the user, indicates the first language, if nothing particular is designated, or the like, step S4 may not be executed. The document being the search result is transmitted to the user terminal 200 by the searching unit 131.

Next, if the document being the received search result is proper because it is marked as correct, helpful, or the like, the user terminal 200 transmits the identifier of the proper document to the information generating apparatus 100 as feedback data 123 from the user. The identifier of the proper document to be transmitted here is an identifier of the document presented to the user as the search result. Accordingly, if the document translated to a language other than the first language by step S4 is presented, the identifier of the proper document is the identifier of the translated document.

Next, if the document presented to the user is in a language other than the first language, the searching unit 131 converts the identifier of the proper document received from the user terminal 200 to an identifier of the corresponding base language (step S5). The identifier of the base language is an identifier of the document in the first language, which is stored in the search target document 121. If the document presented to the user is in the first language, step S5 may not be executed.

Next, for re-training the search model 125, the searching unit 131 adds the search query translated to the first language and the identifier of the proper document to the training data 124 (step S6). Thus, by using the added training data 124, re-training of the search model 125 is performed by the machine learning unit 133 (step S1). In this way, generation of a search model, search for a document with the generated search model and re-training of the search model with the search result are performed.

[Flows of Processing]

Figure 7:
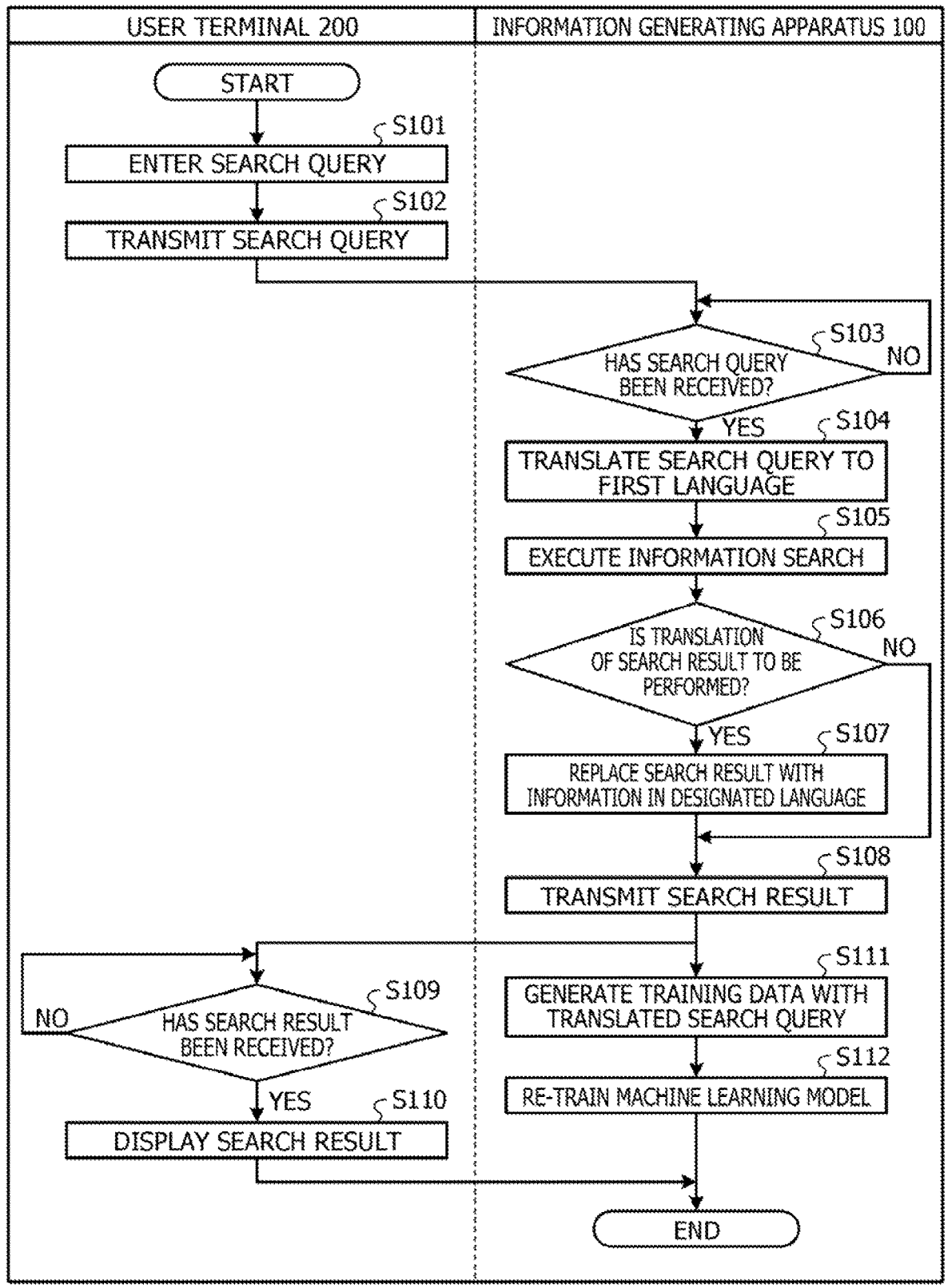
FIG. 7 is a flowchart illustrating a flow of information generation processing according to Embodiment 1.

Next, the information generation processing according to Embodiment 1 will be described more specifically by following a flow of the processing. FIG. 7 is a flowchart illustrating a flow of information generation processing according to Embodiment 1. The information generation processing which will be described with reference to FIG. 7 is started, for example, when a user enters a search query onto an input form for an information search, which is provided to the user terminal 200 by the information generating apparatus 100.

First of all, as illustrated in FIG. 7, a user enters a search query for an information search via the user terminal 200 (step S101). In addition to or separately from the search query, language information on the search query and search result may be entered.

Next, the user terminal 200 transmits the search query entered in step S101 to the information generating apparatus 100 (step S102). If the language information on the search query and search result is entered, the language information is transmitted to the information generating apparatus 100 in addition to or separately from the search query.

Next, if the information generating apparatus 100 has not received a search query from the user terminal 200 (No in step S103), the information generating apparatus 100 waits for reception of a search query. On the other hand, if the information generating apparatus 100 has received a search query (Yes in step S103), the information generating apparatus 100 translates the search query in a language other than the first language received from the user terminal 200 to the first language (step S104).

Next, the information generating apparatus 100 executes the information search by inputting the search query translated to the first language in step S104 to the search model 125 (step S105). Search for a document or the like is thus performed, but, if nothing hits by the search, the fact may be notified to the user terminal 200, and re-entry of a search query may be prompted, or the like, for example.

Next, if the translation of the search result of the information search in step S105 is to be performed (Yes in step S106), the information generating apparatus 100 replaces the search result with information in the language designated by the user (step S107). The case where the translation of a search result is to be performed corresponds to, for example, a case where the language information on the search result is designated by the user. The information to be replaced here is the document acquired by, for example, translating in advance the document in the first language, which is a search result, to a language other than the first language. On the other hand, if the translation of the search result is not to be performed (No in step S106), the processing moves to step S108 without executing step S107.

Next, the information generating apparatus 100 transmits to the user terminal 200 the information replaced in step S107 as a search result or the search result by step S105 if step S107 is not performed (step S108).

Next, if the user terminal 200 has not received the search result from the information generating apparatus 100 (No in step S109), the user terminal 200 waits for reception of a search result. On the other hand, if the user terminal 200 has received the search result (Yes in step S109), the user terminal 200 displays the search result on a display or the like of the user terminal 200 (step S110). After the execution of step S110, the processing on the user terminal 200 side ends.

On the other hand, on the information generating apparatus 100 side, after the execution of step S108, training data is generated with the search query translated to the first language in step S104 as a feature value and the search result by step S105 as a correct answer label (step S111). The generation of training data by step S111 may be performed if a feedback from the user via the user terminal 200 indicates that the result of the information search was correct or the like.

Next, the information generating apparatus 100 re-trains the search model 125 that is a machine learning model for information search by using the training data generated in step S111 (step S112). After execution of step S112, the processing on the information generating apparatus 100 side also ends, and the information generation processing illustrated in FIG. 7 ends.

[Effects]

As described above, the information generating program causes the information generating apparatus 100 to execute processing of, in an information search using a trained machine learning model generated by machine learning using training data in a first language, converting a search condition in a second language different from the first language to the search condition in the first language, searching information in the first language by inputting the search condition converted to the first language to the machine learning model, and generating the training data with the search condition converted to the first language as a feature value and the searched information in the first language as a correct answer label.

Thus, even when a search query for searching information in the first language is in another language, the information generating apparatus 100 converts the search query to the search query in the first language and may thus suppress reduction of precision of searches in the first language due to training data in another language. In this way, the information generating apparatus 100 may improve precision of information searches using the machine learning model.

The processing of generating the training data to be executed by the information generating program includes processing of receiving a feedback for a result of the information search from an information processing terminal having requested the information search, and when the feedback indicates that the result of the information search is correct or helpful, generating the training data with the search condition converted to the first language as a feature value and the searched information in the first language as a correct answer label.

Thus, the information generating apparatus 100 may improve precision of the information search using the machine learning model.

The information generating program causes the information generating apparatus 100 to further execute processing of re-training the machine learning model by using the generated training data.

Thus, the information generating apparatus 100 may improve precision of the information search using the machine learning model.

The information generating program causes the information generating apparatus 100 to further execute processing of transmitting, as a result of the information search, information translated to a language different from the first language corresponding to the searched information in the first language to an information processing terminal having requested the information search.

Thus, the information generating apparatus 100 may perform information provision in the language requested by a user while improving the precision of the information search using the machine learning model.

The processing of transmitting information translated to a language different from the first language to the information processing terminal that the information generating apparatus 100 is caused to execute includes processing of transmitting information translated in advance to a language different from the first language, which corresponds to information in the first language, to the information processing terminal as a result of the information search.

Thus, the information generating apparatus 100 may improve the search response more than that involving translation for each information search while performing information provision in a language requested by a user.

[System]

Unless otherwise specified, processing procedures, control procedures, specific names, and information including various types of data and parameters described above in this document or drawings may be arbitrarily changed. The specific examples, distributions, numerical values, and so forth described in the embodiment are merely exemplary and may be arbitrarily changed.

Each component of each illustrated apparatus is of a functional concept, and may not be physically constituted as illustrated in the drawings. For example, the specific form of distribution or integration of each apparatus is not limited to that illustrated in the drawings. For example, all or part of the apparatus may be configured so as to be functionally or physically distributed or integrated in arbitrary units in accordance with various types of loads, usage states, or the like. For example, the searching unit 131 and translating unit 132 in the information generating apparatus 100 may be integrated.

All or an arbitrary part of the processing functions performed by each apparatus may be implemented by a central processing unit (CPU) and a program analyzed and executed by the CPU or may be implemented as a hardware apparatus using wired logic.

[Hardware]

Figure 8:
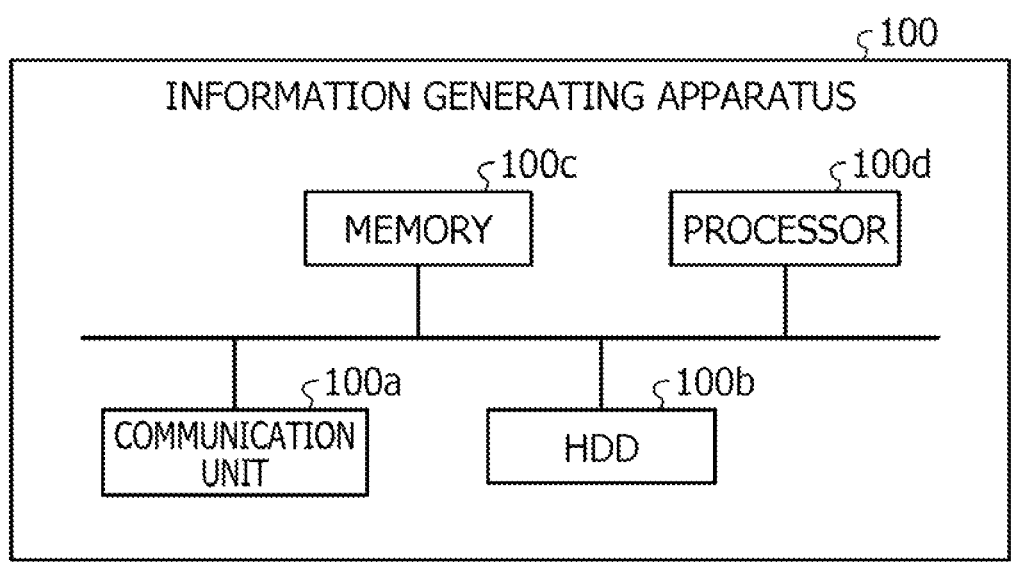
FIG. 8 is a diagram describing an example of a hardware configuration.

The hardware configuration of the aforementioned information generating apparatus 100 will be described. FIG. 8 illustrates a hardware configuration example. As illustrated in FIG. 8, the information generating apparatus 100 includes a communication unit 100a, a hard disk drive (HDD) 100b, a memory 100c, and a processor 100d. The components illustrated in FIG. 8 are coupled to each other by a bus or the like.

The communication unit 100a is a network interface card or the like and communicates with another server. The HDD 100b stores programs for causing the functions illustrated in FIG. 2 to operate and a database (DB).

The processor 100d reads, from the HDD 100b or the like, programs that perform processing similar to the processing performed by the processing units illustrated in FIG. 2 and loads the read programs onto the memory 100c, whereby a process that executes the functions described with reference to FIG. 2 or the like is operated. For example, this process executes the functions similar to the functions of the processing units included in the information generating apparatus 100. For example, the processor 100d reads, from the HDD 100b or the like, programs that implement functions similar to those of the searching unit 131, the translating unit 132, and the like. The processor 100d executes the process that performs processing similar to processing of the searching unit 131, the translating unit 132, and the like.

As described above, the information generating apparatus 100 operates as an information processing apparatus that performs each processing by reading and executing a program. The information generating apparatus 100 may also implement the functions similar to the functions of the above-described embodiment by reading out the above-described programs from a recording medium with a medium reading device and executing the above-described read programs. The programs described in other embodiments are not limited to the programs to be executed by the information generating apparatus 100. For example, the present disclosure may be similarly applied when another computer or server executes the programs or when another computer and server execute the programs in cooperation with each other.

The programs may be distributed over a network such as the Internet. The program may be recorded on a computer-readable recording medium such as a hard disk, a flexible disk (FD), a compact disc read-only memory (CD-ROM), a magneto-optical (MO) disk, or a Digital Versatile Disc (DVD) and may be executed by being read from the recording medium by the computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information generating program causing a computer to execute processing of:
   receiving a search condition in a second language different from a first language;
   in an information search using a trained machine learning model generated by machine learning using training data in the first language, converting the search condition in the second language to a search condition in the first language;
   searching information in the first language by inputting the search condition converted to the first language to the machine learning model;
   prompting a re-entry of another search condition in the second language when the searched information is not acquired;
   converting, when language information for the searched information is designated by a user, the searched information in the first language to the searched information in a language based on the language information;
   transmitting the searched information in the first language or the searched information in the language based on the language information; and
   generating training data with the search condition converted to the first language as a feature value and the searched information in the first language as a correct answer label,
   wherein the processing of generating the training data includes processing of: receiving a feedback for a result of the information search from an information processing terminal having requested the information search; and when the feedback indicates that the result of the information search is correct or helpful, generating the training data with the search condition converted to the first language as a feature value and the searched information in the first language as a correct answer label,
   wherein the computer is further caused to execute processing of re-training the machine learning model by using the generated training data.

2. The non-transitory computer-readable recording medium storing an information generating program according to claim 1, wherein the searched information in the first language or the searched information in the language based on the language information is transmitted to an information processing terminal having requested the information search.

3. The non-transitory computer-readable recording medium storing an information generating program according to claim 2, wherein the processing of converting the searched information in the first language to the searched information in the language based on the language information includes processing of setting, as the searched information in the language based on the language information, information which is translated in advance to the language based on the language information and corresponds to the searched information in the first language.

4. An information generating method comprising:
   receiving a search condition in a second language different from a first language;
   converting, by a computer, in an information search using a trained machine learning model generated by machine learning using training data in the first language, the search condition in the second language to a search condition in the first language;
   searching information in the first language by inputting the search condition converted to the first language to the machine learning model;
   prompting a re-entry of another search condition in the second language when the searched information is not acquired;
   converting, when language information for the searched information is designated by a user, the searched information in the first language to the searched information in a language based on the language information;
   transmitting the searched information in the first language or the searched information in the language based on the language information; and
   generating training data with the search condition converted to the first language as a feature value and the searched information in the first language as a correct answer label,
   wherein the processing of generating the training data includes processing of: receiving a feedback for a result of the information search from an information processing terminal having requested the information search; and when the feedback indicates that the result of the information search is correct or helpful, generating the training data with the search condition converted to the first language as a feature value and the searched information in the first language as a correct answer label,
   wherein the information generating method further includes re-training the machine learning model by using the generated training data.

5. The information generating method according to claim 4, wherein the searched information in the first language or the searched information in the language based on the language information is transmitted to an information processing terminal having requested the information search.

6. The information generating method according to claim 5, wherein the converting the searched information in the first language to the searched information in the language based on the language information includes processing of setting, as the searched information in the language based on the language information, information which is translated in advance to the language based on the language information and corresponds to the searched information in the first language.

7. An information processing apparatus comprising:
a memory; and
a processor coupled to the memory and configured to:
receive a search condition in a second language different from a first language;
convert in an information search using a trained machine learning model generated by machine learning using training data in the first language, the search condition in the second language to a search condition in the first language;
search information in the first language by inputting the search condition converted to the first language to the machine learning model;
prompt a re-entry of another search condition in the second language when the searched information is not acquired;
convert, when language information for the searched information is designated by a user, the searched information in the first language to the searched information in a language based on the language information;
transmit the searched information in the first language or the searched information in the language based on the language information; and
generate training data with the search condition converted to the first language as a feature value and the searched information in the first language as a correct answer label, wherein the processing of generate the training data includes processing of: receiving a feedback for a result of the information search from an information processing terminal having requested the information search; and when the feedback indicates that the result of the information search is correct or helpful, generating the training data with the search condition converted to the first language as a feature value and the searched information in the first language as a correct answer label,
wherein the processor re-trainings the machine learning model by using the generated training data.

8. The information processing apparatus according to claim 7, wherein the searched information in the first language or the searched information in the language based on the language information is transmitted to an information processing terminal having requested the information search.

9. The information processing apparatus according to claim 8, wherein a processing to convert the searched information in the first language to the searched information in the language based on the language information includes processing of setting, as the searched information in the language based on the language information, information which is translated in advance to the language based on the language information and corresponds to the searched information in the first language.

* * * * *